(No Model.) 2 Sheets—Sheet 1.

A. W. LINTON.
MACHINE FOR KNEADING DOUGH.

No. 592,797. Patented Nov. 2, 1897.

Witnesses.
C. E. Knight
John J. Martin

Inventor.
August W. Linton
By his Attorney
P. H. Gunckel (No Model.) 2 Sheets—Sheet 2.

A. W. LINTON.
MACHINE FOR KNEADING DOUGH.

No. 592,797. Patented Nov. 2, 1897.

Witnesses.
C. E. Knight
John J. Martin

Inventor.
August W. Linton
By his Attorney.
P. H. Gunckel

UNITED STATES PATENT OFFICE.

AUGUST W. LINTON, OF MINNEAPOLIS, MINNESOTA, ASSIGNOR OF TWO-THIRDS TO JOHN A. SMITH AND SIMEON SCHNORENBERG, OF SAME PLACE.

MACHINE FOR KNEADING DOUGH.

SPECIFICATION forming part of Letters Patent No. 592,797, dated November 2, 1897.

Application filed April 19, 1897. Serial No. 632,809. (No model.)

*To all whom it may concern:*

Be it known that I, AUGUST W. LINTON, a citizen of the United States, residing at Minneapolis, in the county of Hennepin and State of Minnesota, have invented certain new and useful Improvements in Machines for Kneading Dough, of which the following is a specification.

My invention relates to devices for mixing and kneading dough.

The object of the invention is to provide a convenient mechanism that will avoid the laborious operation of hand mixing and kneading, while accomplishing fully as good if not better results.

The improvements, stated in a general way, comprise a cylindrical vessel containing mixers or beaters and gearing or similar devices for rotating both the cylinders and beaters, together with means for introducing flour and discharging the kneaded dough, and additional devices are shown for introducing liquid and also for discharging the dough.

My improvements are illustrated in the accompanying drawings, in which—

Figure 1:
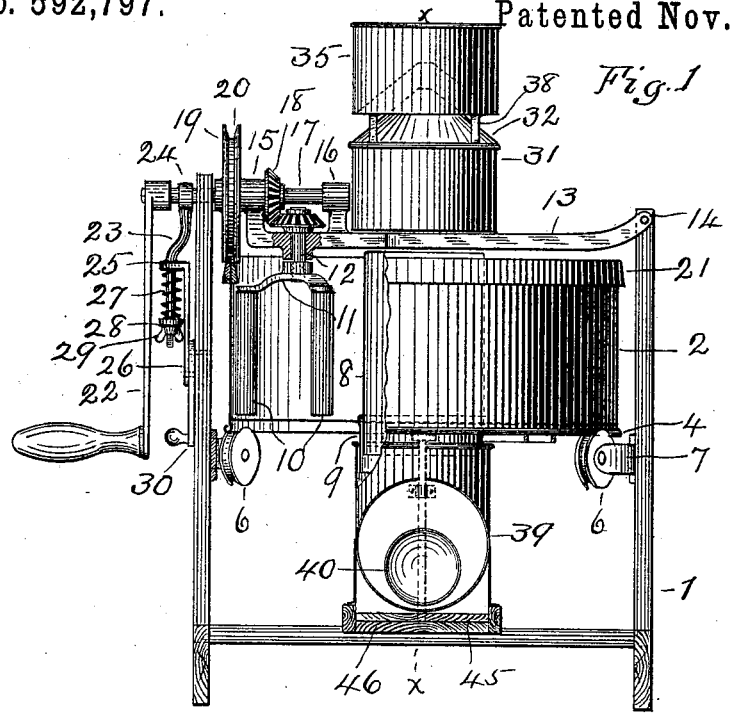
Figure 2:
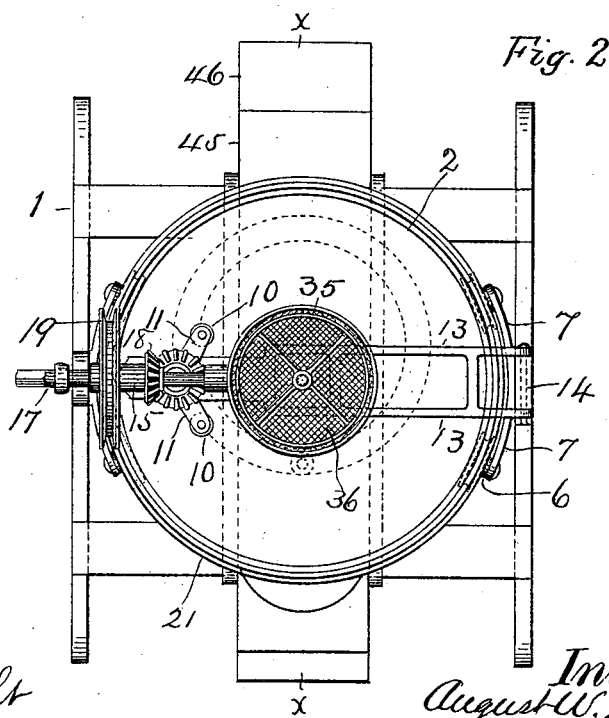
Figure 3:
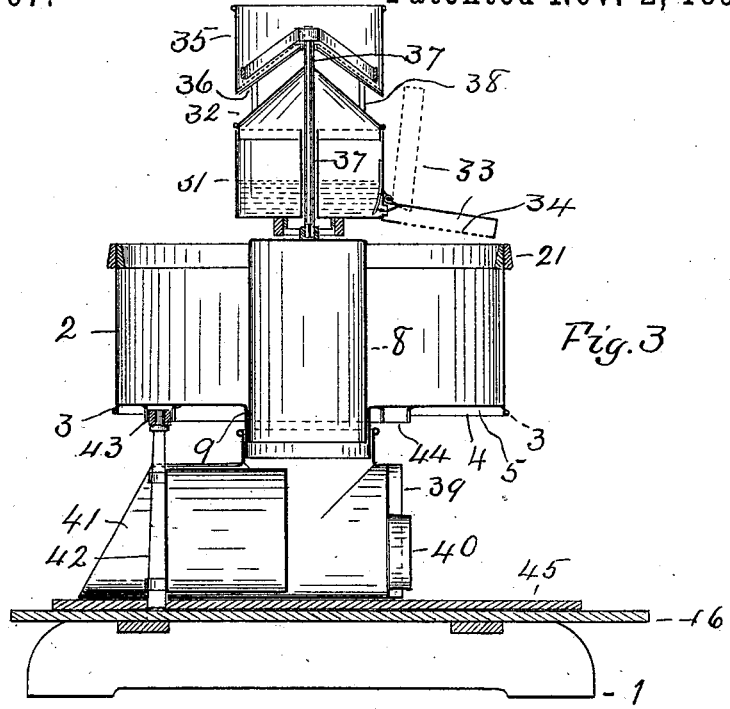

Figure 1 is a front elevation, partly in section, of the machine. Fig. 2 is a plan view of the same. Fig. 3 is a vertical view on the line *x x* of Figs. 1 and 2, and Fig. 4 a view in elevation of a simplified form of the machine.

In the drawings, 1 designates a frame of any form for suitably supporting the operating devices of the machine, and 2 the cylinder in which the dough is kneaded. This cylinder is preferably made of sheet metal, having its lower edge bent around a wire in the usual way, as indicated at 3 in the drawings, and this edge forming a flange 4, which projects below the bottom 5 of the cylinder. This flange rests in the grooves of a series, four or more, of grooved wheels 6, which may be supported on arms 7, fastened to the frame of the machine, and in this way the cylinder is revolubly supported. Concentric with the cylinder 2 is a smaller cylinder 8, and it is in the annular chamber between the inner and outer cylinders that the dough is kneaded. The inner cylinder 8 may be supported by seating it in a downwardly-projecting outlet 9, formed concentrically in the base of the cylinder 2. In the annular space between these cylinders are beaters or kneaders 10, preferably three or more in number, and carried on a spider 11, which is attached to the lower end of the spindle 12. This spindle is journaled in a box supported by a horizontal frame 13 above the cylinder 2. This frame is preferably composed of two parallel bars connected by cross-bars at suitable intervals and is pivoted at one end to the main frame 1, as shown at 14, and is designed to serve as the support for the operating and other parts above the cylinder 2. On this frame are boxes 15 and 16, one on its free end and the other near it, in which a shaft 17 is journaled. On this shaft is a beveled gear-wheel 18, which meshes with a similar gear on the splindle 12 for rotating the latter to operate the beaters 10 when the shaft 17 is turned. This shaft also carries a friction-wheel 19, having a groove 20 for engaging and revolving the cylinder 2. For this purpose the upper edge of the cylinder is covered by a circular cap 21, which tapers both inward and outward, as shown in Figs. 1 and 3, to correspond approximately to the groove 20 and be frictionally engaged therein, and thus by the rotation of the shaft 17 the cylinders 2 and 8 may be revolved and the kneaders 10 operated in the space between them. On the end of the shaft 17 is a crank 22 for turning it to operate the machine.

To control the frictional contact of the friction-wheel 19 with the top of the cylinder 2, there is provided at the side of the machine-frame a bar 23, having a hook 24 at its upper end for engaging the shaft 17, and its shank passes through an ear 25, formed on a lever-arm 26. About the shank is a spiral spring 27, bearing against the ear 25 and a collar 28, and below this collar, for the purpose of regulating the spring tension, is a thumb-screw 29. The lever 26 is pivoted eccentrically to a lever 30, so that by the swinging of the latter in one direction the lever 26 and the bar 23 may be lifted, and by swinging in the opposite direction the bar and lever may both be pulled downward and locked.

Concentric with the cylinders 2 and 8 and supported on the pivoted frame 13 is a water-tank 31, having its upper surface 32 formed into a cone. At one side of this tank is a pivoted spout 33, having perforations at 34 at its under side for discharging water in small jets into the cylinder 2. When not in use, the spout may be turned upward, as indicated by the dotted lines in Fig. 3, so as to prevent the discharge of water. Above this tank is a flour-sifter 35, having its sieve-surface 36 of concave form, corresponding substantially to the conical shape of the water-tank for sifting flour onto the cone 32 and causing it to be distributed therefrom into the cylinder 2. The flour-receptacle 35 is mounted on a spindle 37, that has its lower end connected to the central cylinder 8, so as to turn with the latter. To prevent the flour-receptacle from tipping sidewise, posts 38 are provided either on the flour-receptacle or water-tank, so as to travel in grooves or upon the rim of the opposite vessel. By these devices, as will be apparent, flour may be sifted from the flour-receptacle onto the cone of the water-tank and distributed evenly to the cylinder 2 at the same time that water is being sprayed into the cylinder by means of the spout 34.

When it is desired to remove the operating parts from the frame and cylinder, the lever 30 may be swung to position to allow the hook 24 to be removed from the shaft 17, and then the spider 11 may be detached from the spindle 12 or the beaters 10 may be removed from the spider, as may be desired, whereupon the frame 13 may be turned upward upon its hinge, carrying with it all the parts it supports. After the operating parts have been so removed the cylinder 8 may be lifted out of its socket and the dough discharged through the outlet 9 of the cylinder 2. For the purpose of forming the dough so discharged into portions of such sizes as may be desired there is provided below the outlet 9 a cylindrical receptacle 39, having a discharge-outlet 40, which may be of such shape and size as to determine the quantity of dough to be discharged through it at one operation, and within the cylinder 39 is a piston 41 for forcing the dough through the outlet 40. This piston is carried by the post 42, upon the upper end of which is a roller 43, which is arranged to travel in an eccentric groove 44, formed by flanges fastened on the bottom of the cylinder 2. The path of the eccentric movement is about as indicated by the dotted lines in Fig. 2. The lower end of the post 42 is fastened to a board 45, that slides on the base or table 46 and moves in harmony with the piston 41. The post 42, being incapable of movement other than in direction radial to the cylinder 2 because of its connection with the cylindrical piston in the cylindrical casing, will be moved radially in and out, so as to reciprocate the piston when the cylinder is revolved. This operation of ejecting the dough may be performed by the turning of the crank, as in the operation of kneading, but after the inner cylinder 8 has been removed.

Figure 4:
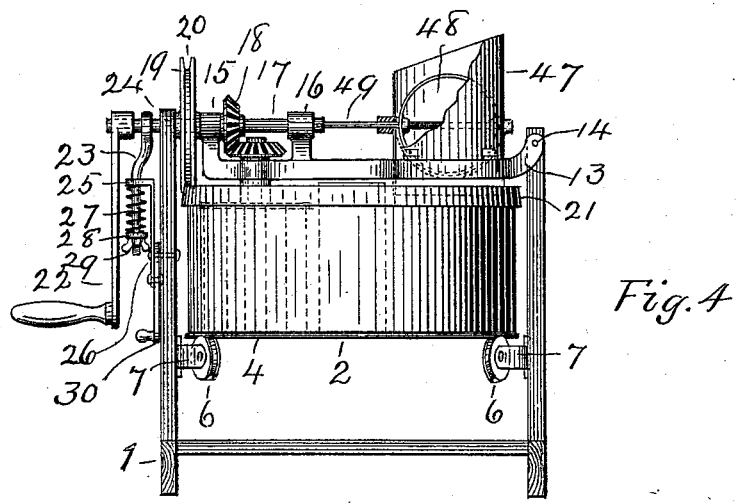

The simplified machine illustrated in Fig. 4 is constructed and operated in substantially the same manner as that originally described, but the water-tank and the dough-discharging devices are omitted. In place of the flour-sifter before described there is substituted a cylindrical vessel 47, mounted on the frame 13 near its pivotal end. The vessel is provided with a suitable sieve in its bottom, and within it is a beater 48, of circular or any other suitable form, for stirring up the flour, which is operated by means of a horizontal shaft 49, connected to the shaft 17. It is preferable that the beater 48 or the shaft 49 may be detachably connected in order that they and the vessel 47 may be readily removed when desired.

Having described my invention, what I claim is—

1. In a dough-kneader, a main frame, a cylinder revolubly supported thereby, beaters in the cylinder, an upper frame hinged to the main frame, a shaft journaled in boxes on said hinged frame, gearing connecting the shaft with the cylinder and beaters for revolving them simultaneously, and an adjustable yielding support for the shaft, substantially as set forth.

2. In a dough-kneader, the combination, with the revoluble cylinder and beaters and means for operating them, of the superposed water-tank having the perforated discharge-pipe, and the flour-sifter mounted above the tank and arranged to be revolved by the movement of the cylinders, substantially as set forth.

3. The combination, with the dough-kneading cylinder and means for revolving it, of the water-tank mounted above it and having a perforated pipe for spraying water in the cylinder, substantially as set forth.

4. The combination, with the dough-kneading cylinder and the revoluble concentric inner cylinder, of the dough-discharging devices comprising a casing, a discharge-outlet, a piston, an eccentric track on the bottom of the cylinder, and suitable connections between the piston and track, whereby the revolutions of the cylinder cause the piston to reciprocate and discharge the dough intermittently, substantially as set forth.

5. The combination, with the kneading-cylinder and shaft for operating it, of a flour-receptacle mounted above the cylinder, a beater therein, and a connection between the shaft and beater for operating the latter, substantially as set forth.

In testimony whereof I have hereunto set my hand this 12th day of April, 1897.

AUGUST W. LINTON.

In presence of—
P. H. GUNCKEL,
CORINNE E. KNIGHT.